(No Model.)
2 Sheets—Sheet 1.
J. R. SUTER.
CULTIVATOR.
No. 528,825.
Patented Nov. 6, 1894.
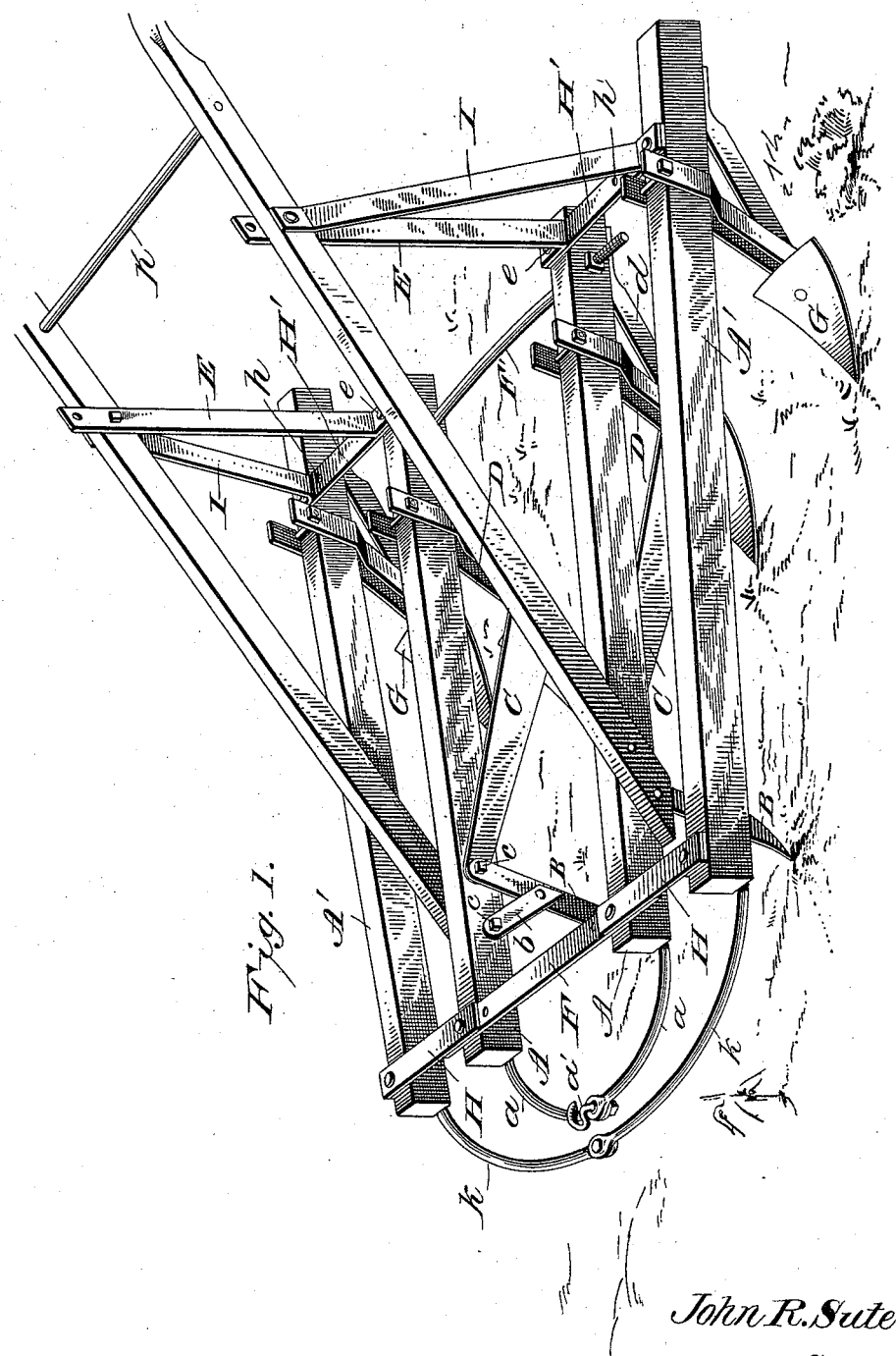
John R. Suter,
Inventor
Witnesses (No Model.) 2 Sheets—Sheet 2.
J. R. SUTER.
CULTIVATOR.
No. 528,825. Patented Nov. 6, 1894.
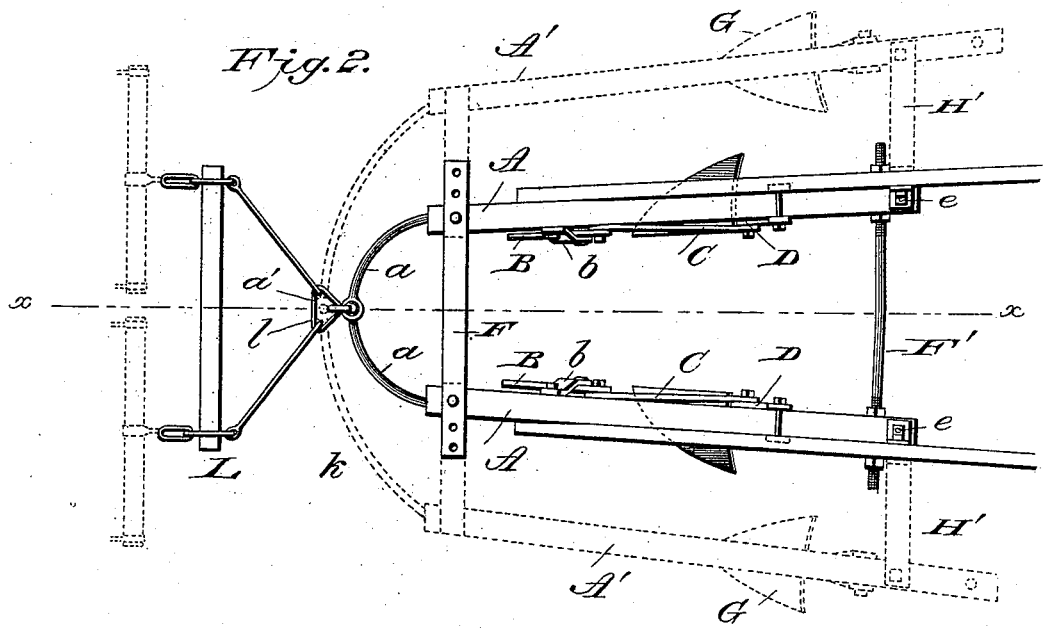
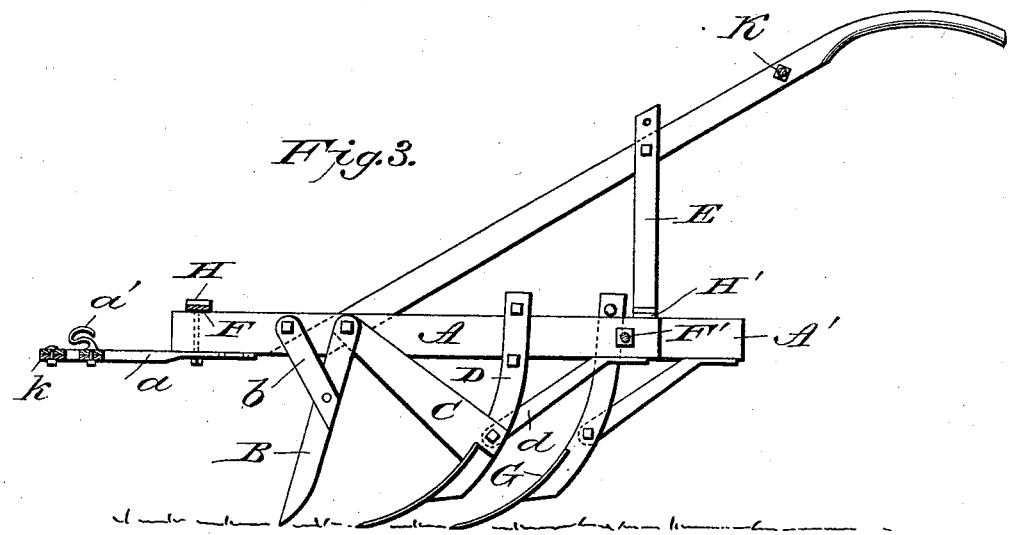
John R. Suter
Inventor
Witnesses

UNITED STATES PATENT OFFICE.

JOHN RANDOLPH SUTER, OF CONWAY, ARKANSAS.

CULTIVATOR.

SPECIFICATION forming part of Letters Patent No. 528,825, dated November 6, 1894.

Application filed August 31, 1892. Renewed August 30, 1894. Serial No. 521,755. (No model.)

*To all whom it may concern:*

Be it known that I, JOHN RANDOLPH SUTER, a citizen of the United States of America, residing at Conway, in the county of Lamar and State of Arkansas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in cultivators; the object of the same being to provide a cultivator which consists of a plurality of beams which are connected to each other so as to be adjustable when used together, the outer beams being detachable from the inner beams so that said inner beams can be used independent when desired, the shovels carried thereby being provided with fenders and colters; and the invention consists in the construction and arrangement of the parts, as will be hereinafter fully set forth and particularly pointed out in the claims.

In the accompanying drawings forming part of this specification: Figure 1 is a perspective view. Fig. 2 is a plan view showing the outer beams in dotted lines, and Fig. 3 is a sectional view taken through the line $x$—$x$ of Fig. 2.

A A designate the inner beams, which are provided at their forward ends with semi-circular bars $a$ $a$ having eyes at their forward ends through which passes a hook $a'$, the lower end of said hook being threaded to receive a nut for connecting the parts. To the inner sides of these beams are attached cutters B, which are braced to said beams by inclined pieces $b$ $b$ as shown, the bolts for connecting these parts extending horizontally through the beams and providing a means for securing the handles thereto; two of the bolts, $c$, $c$, also passing through the fenders C C the lower ends of which are attached to the standards D D carrying the cultivator shovels, said shovels being extended to but one side of the standards as shown in Fig. 2. Each standard D is made of a single piece which is bent to provide parallel members which embrace the beam and are clamped by a suitable bolt; said standards having rearwardly extending braces $d$ through the rear ends of which pass vertical bolts $e$ which also serve for connecting the adjusting plates and vertical uprights attached the handles to the beams. The uprights E are provided with a number of perforations, so that when the lateral adjustment of the beams is made apertures for the proper adjustment of the handles are provided.

The front ends of the beams A A are connected to each other by a transverse plate F, which is bolted to the upper ends of the beams, and the rear ends of these beams are connected to each other by a rod F' which passes through the beam and has its ends threaded to receive nuts. By means of the plate F and rod F' the distance between the beams can be varied.

A' A' designate the outer beams, which are provided with shovels G of ordinary construction, which shovels are carried by standards rigidly secured to the beams. Plates H connect the forward ends of the beams A' to the beams A, and similar plates, H', having a series of perforations $h$ connect the rear ends of the outer beams to the inner beams.

I I designate inclined standards which extend from the outer beams to the handles, and said handles are connected to each other by an adjustable cross-bar K as shown.

L designates the draft attachment, which consists of single trees which are connected to the spreader bar and rods which engage with a triangular link $l$, said link being adapted to engage with the hook $a'$ which connects the bars to each other; and when the outer beams are used the curved bars $k$ attached to the forward ends thereof and jointed in front of the hook will lie under this triangular link, and if desired the connecting pivot bolt may pass through said triangular link.

When the outer bars are detached the device can be used as a straddle-row cultivator, and it will be noted that the beams can be adjusted to and from the plants as desired.

When it is desired to use the device as an ordinary cultivator the fenders can be removed and the usual form of shovels attached.

It will be observed that the parts are adjustable, and that I provide a simple and effective cultivator.

I am aware that prior to my invention it has been proposed to provide a cultivator with beams which are adjustable laterally to and from each other; also that it is not new to connect the outer beams to the inner ones and provide means for adjusting said beams laterally, and I therefore do not claim such construction broadly.

Having thus described my invention, what I claim as new, and desire to secure by Letters Patent, is—

1. In a cultivator, the combination, of the main beams A A connected to each other at their forward ends by a plate F and adjustably at their rear ends by a bar F' having threaded ends to receive the adjusting nuts, draft-bars $a$ $a$ connected to said beams and to each other, together with supplemental side beams carrying shovels and connected to the main beams, substantially as shown, and for the purpose set forth.

2. A cultivator comprising the main beams A A carrying shovels and connected to each other at their forward ends by a plate and adjustably at their rear ends by a bar F' having threaded ends to receive the adjusting nuts, supplemental beams A' A' carrying shovels and connected to the main beams by short plates H and H', and draft-bars attached to the forward ends of the beams and pivotally connected to each other, substantially as shown, and for the purpose set forth.

In testimony whereof I affix my signature in presence of two witnesses.

JOHN RANDOLPH SUTER.

Witnesses:
S. P. C. SMITH,
DARIUS MONROE.